Patented June 1, 1937

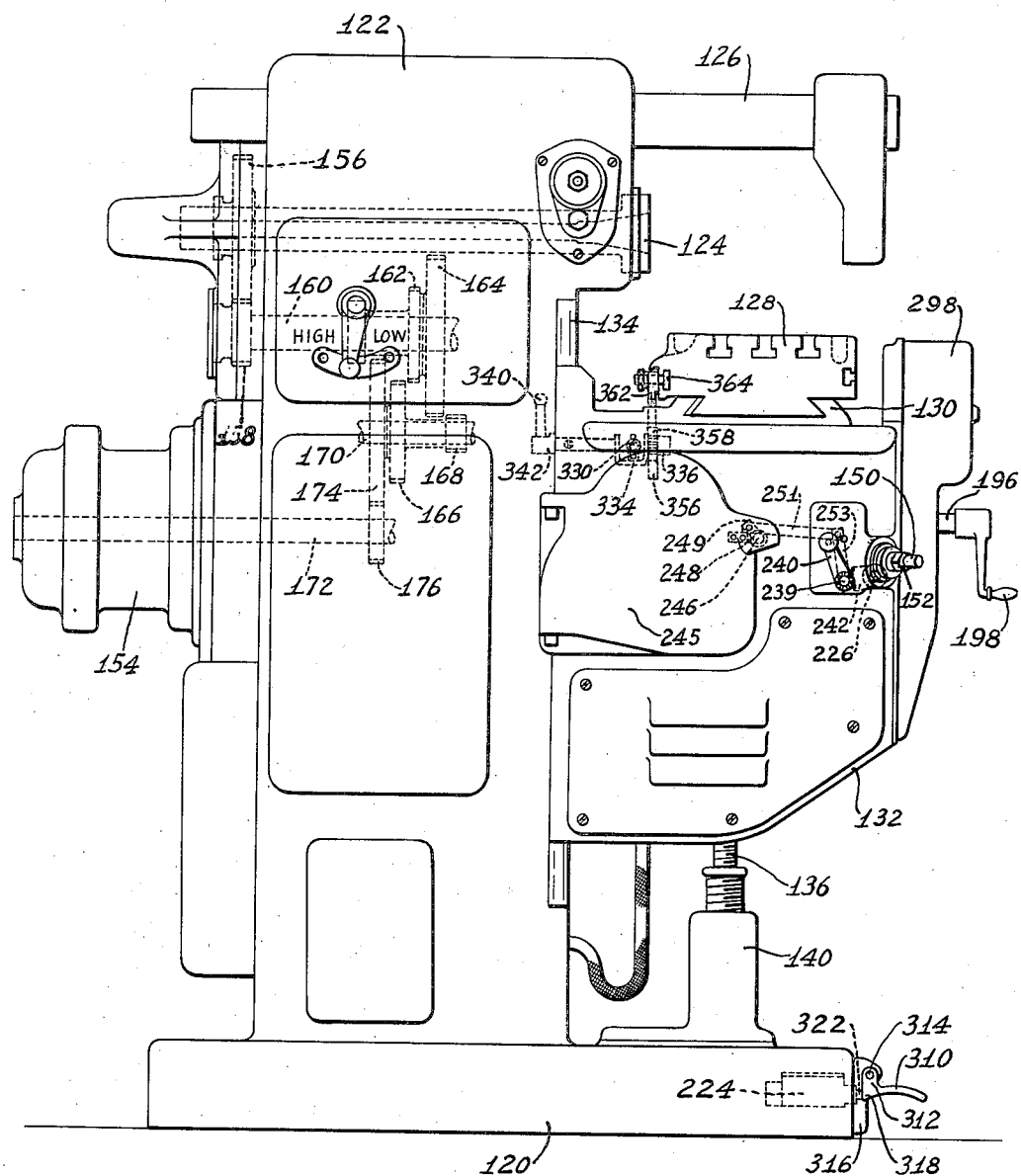

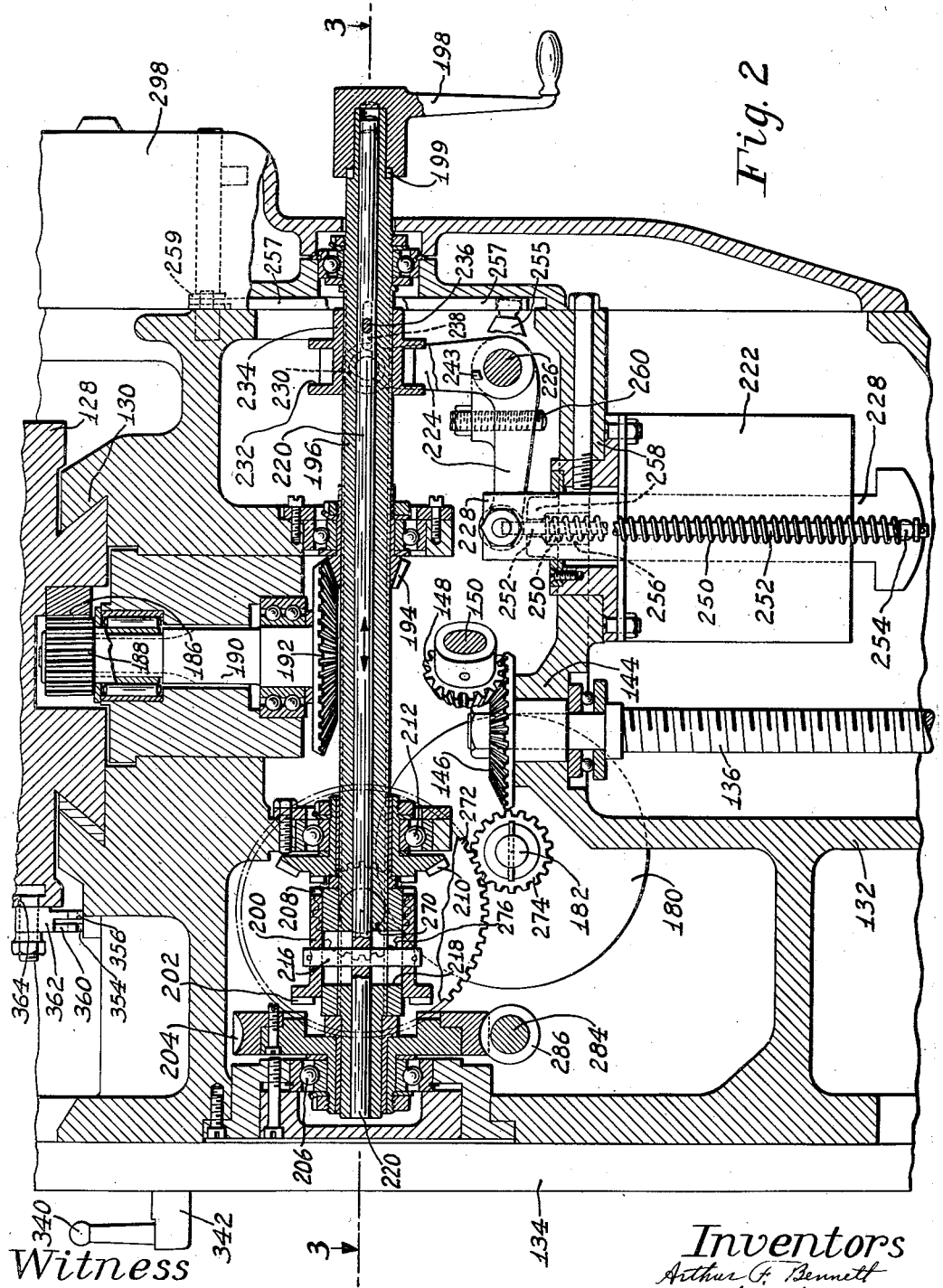

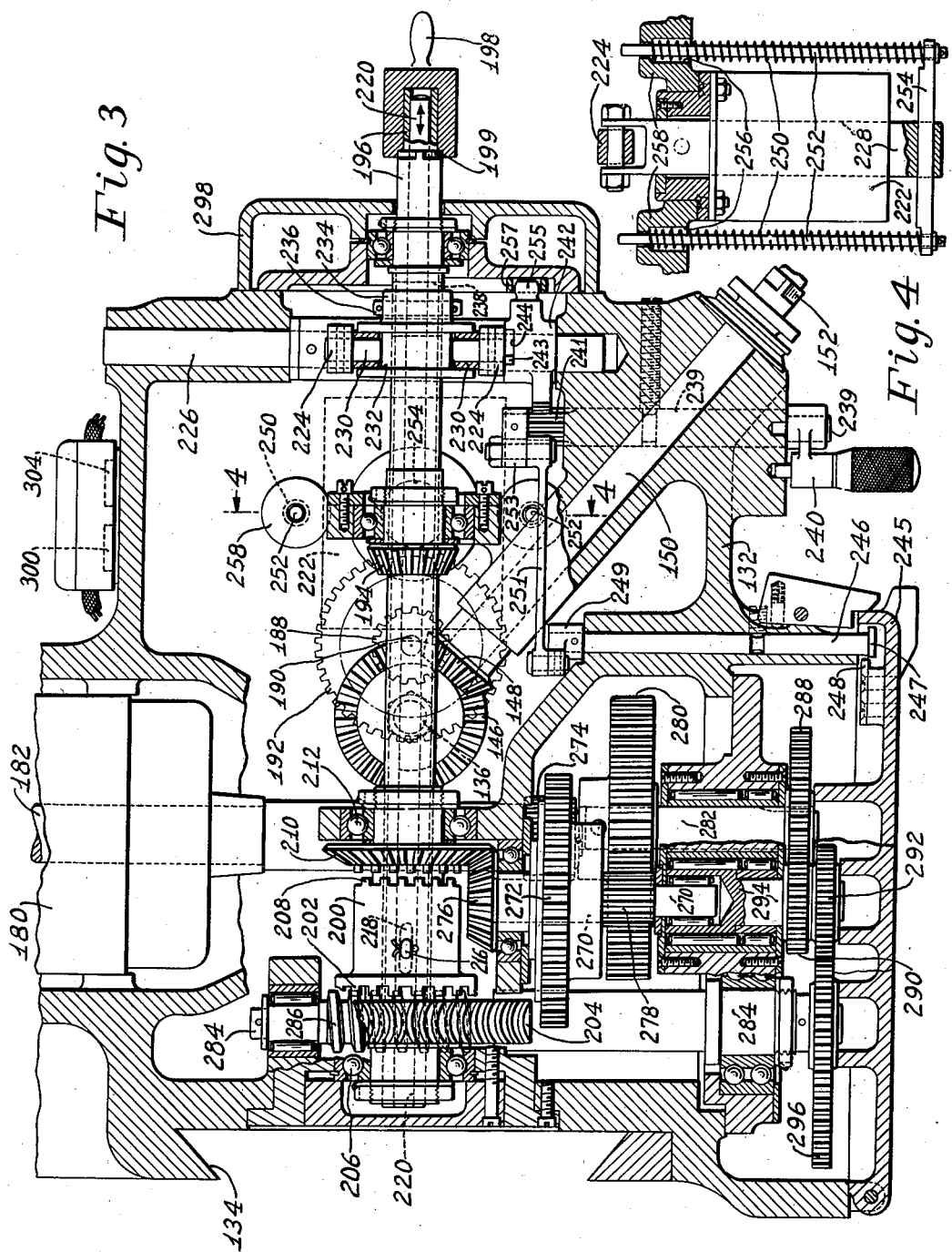

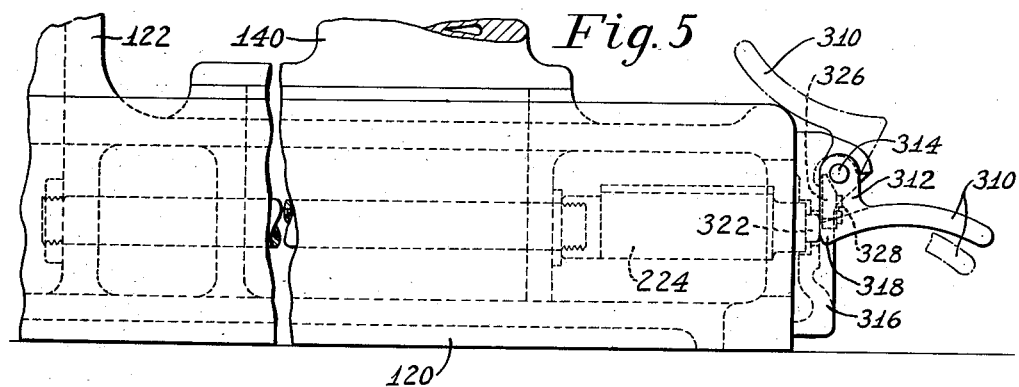
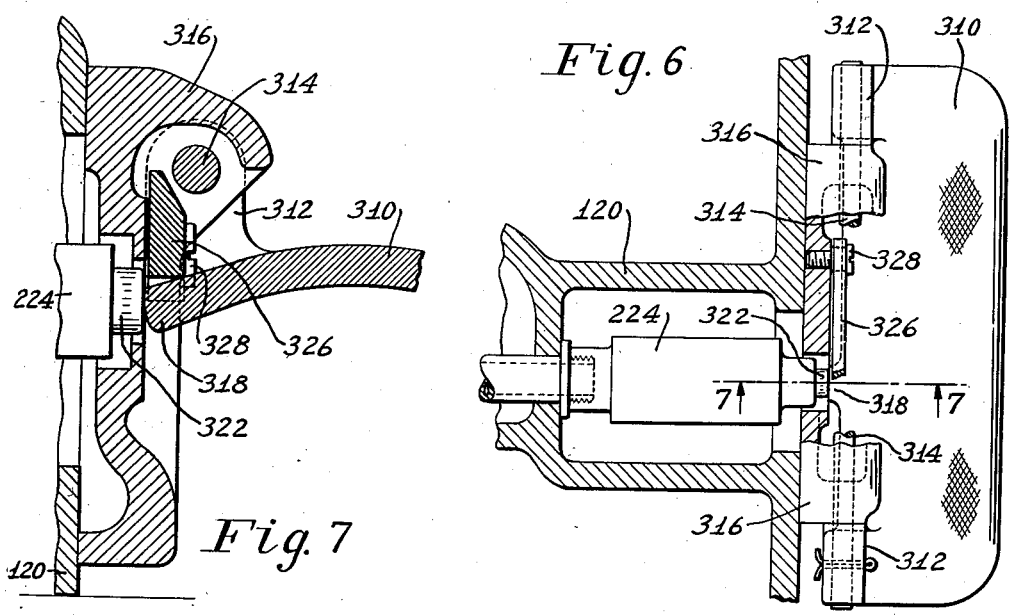
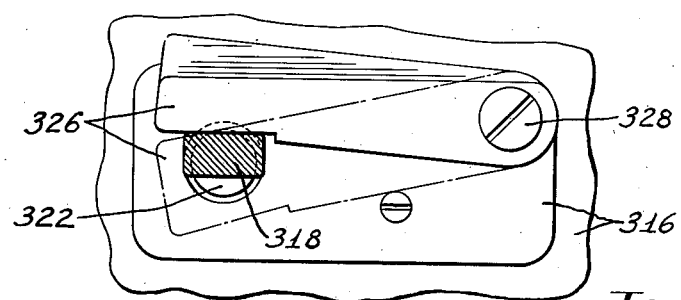

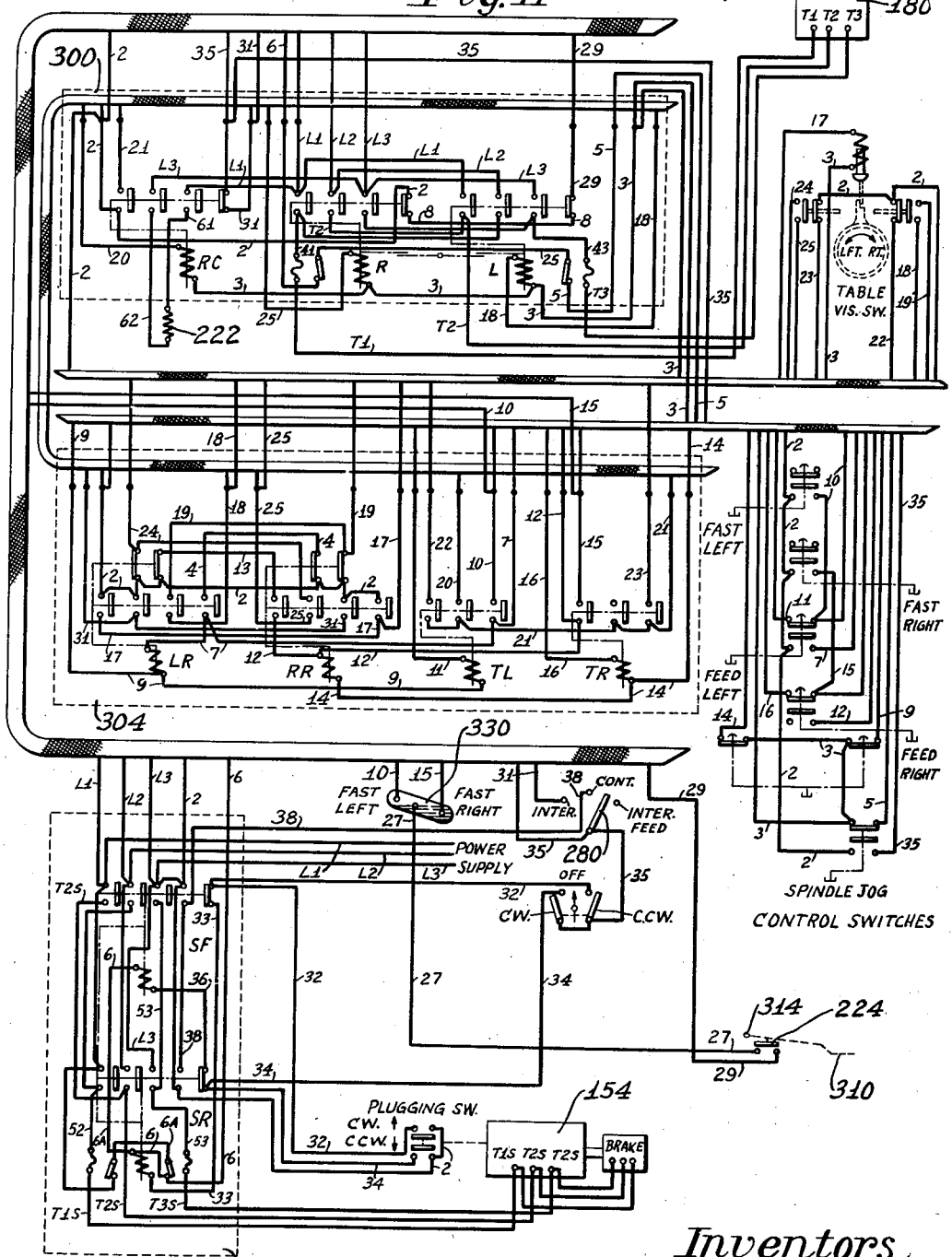

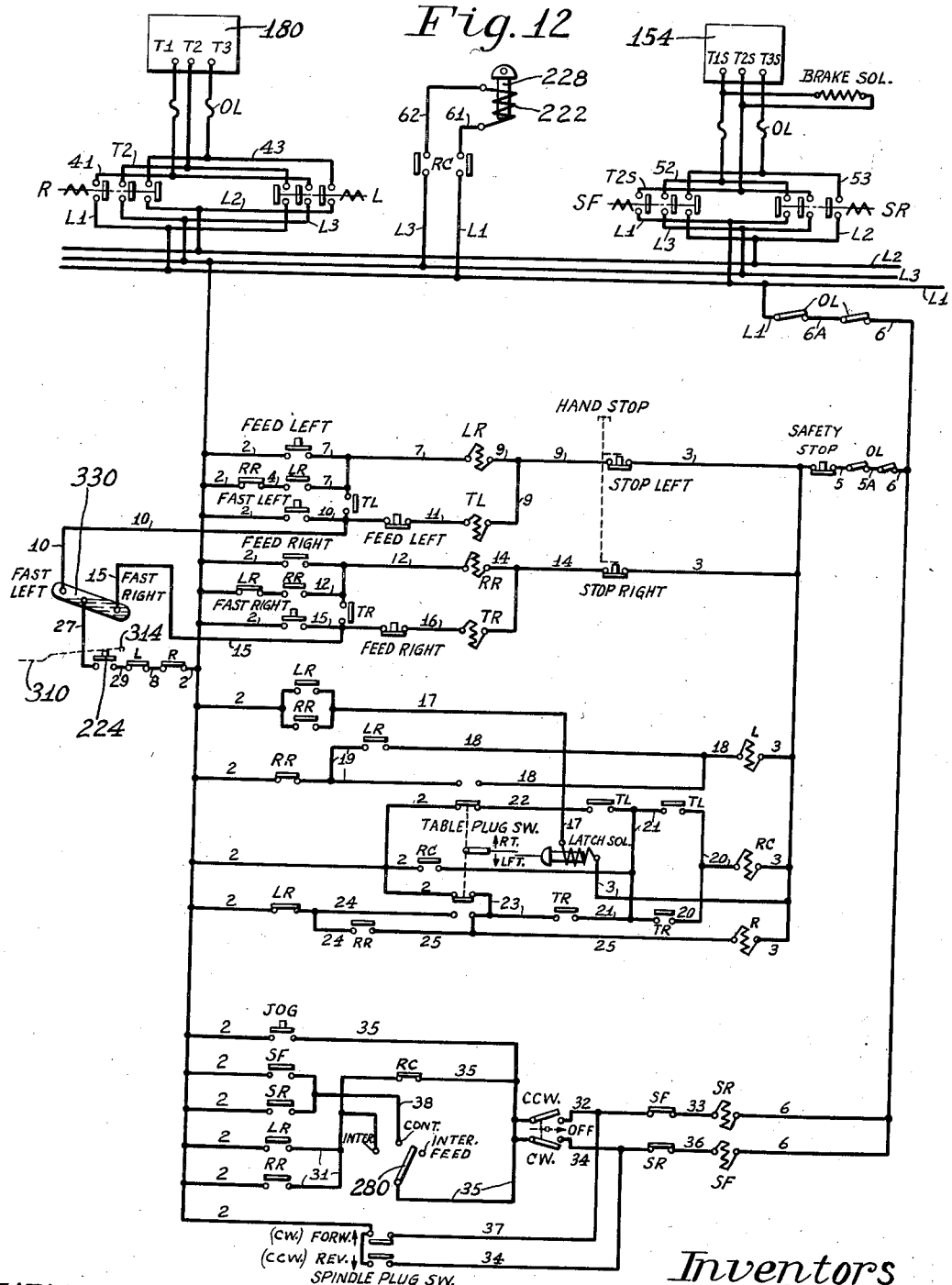

2,082,140

UNITED STATES PATENT OFFICE 2,082,140

MILLING MACHINE

Arthur F. Bennett, West Barrington, and August L. Krause, Providence, R. I., assignors to Brown and Sharpe Manufacturing Company, a corporation of Rhode Island Application May 1, 1935, Serial No. 19,214

19 Claims. (Cl. 90—21)

The present invention relates to improvements in machine tools, and is herein disclosed as embodied in a milling machine of the type which includes a rotary cutter spindle supported on the machine column, a vertically adjustable knee, and a work table slidably supported on the knee for transverse reciprocatory movements with relation to the cutter.

Machines of this description as ordinarily constructed, are provided with an automatic drive for rotating the cutter spindle and for imparting feeding movements to the table in timed relation thereto at a rate or rates which are carefully selected in accordance with the depth of cut to be taken, and the character of the work to secure a maximum speed of operation consistent with quality of workmanship and the cutting load for which the machine is designed. It is the usual practice to drive the cutter spindle and the table from a single source of power located in the machine column, through mechanical driving connections which are adjustable to secure exactly the required speed of rotation of the spindle and rate of movement of the table both for feeding and quick traverse operation. The drive for the table is ordinarily transmitted from the primary source of power in the machine column to the vertically adjustable knee or a saddle as the case may be, through one or more floating drive shafts fitted with universal connections to permit a free transmission of the drive regardless of variations in the adjustment of saddle or knee.

It is a principal object of the present invention to provide a novel and improved machine of this general description having a separate driving unit for power operation of the table at both feeding and quick traverse rates, which is mounted integrally with the work supporting assembly including the table and the movable support or supports on which the table is mounted to slide, which is self-contained, and is wholly independent of any power source mounted in the stationary base or column of the machine.

It is a further object of the present invention to provide in a machine of this general description having separate electrical driving units for the spindle and for the work supporting table, novel and improved control devices for the same which are well adapted to secure a greater versatility in operation of the machine both automatically and under the control of the operator over a wide range of operating conditions.

Figure 9:
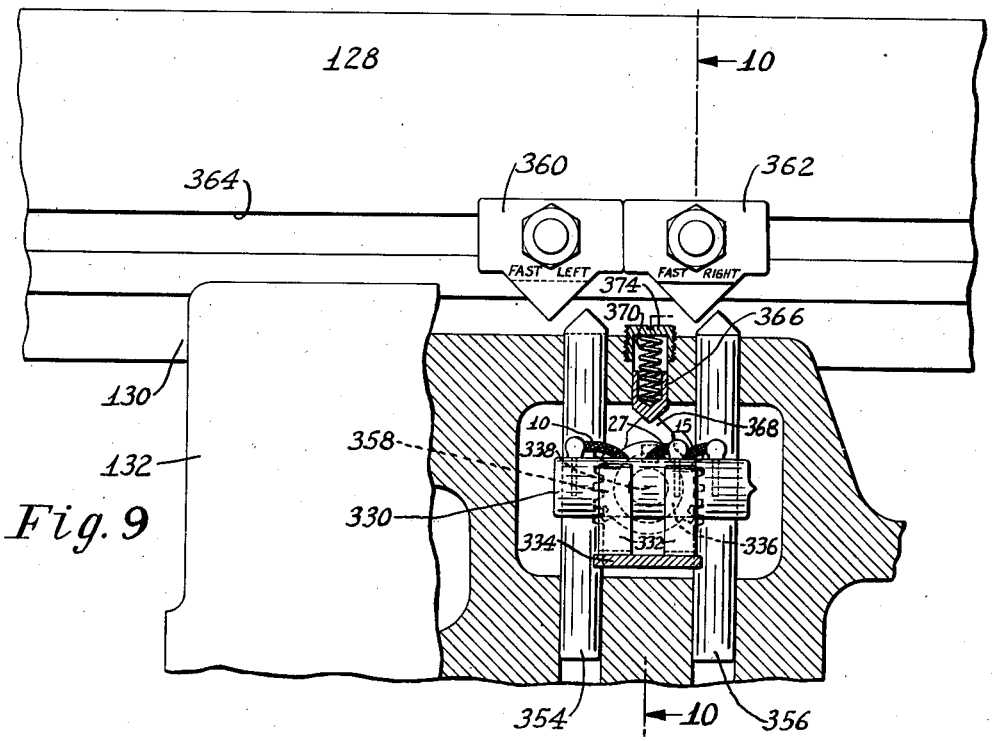
Figure 10:
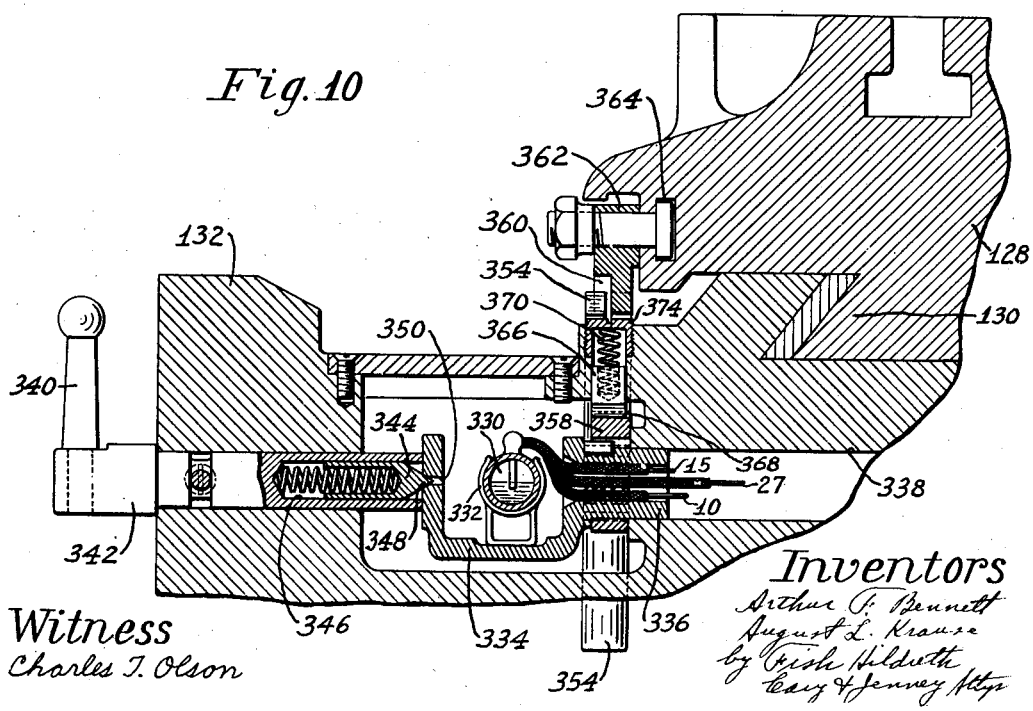

With these and other objects in view, as may hereinafter appear, the several features of the invention consist in the devices, combinations and arrangements of parts hereinafter described and claimed, which together with the advantages to be obtained thereby, will be readily understood by one skilled in the art from the following description taken in connection with the accompanying drawings, in which Fig. 1 is a view in side elevation of a milling machine embodying the several features of the invention; Fig. 2 is a sectional view looking from the left taken through a center line of the knee to illustrate particularly the table driving connections; Fig. 3 is a sectional plan view taken on the line 3—3 of Fig. 2; Fig. 4 is a detail sectional view taken on the line 4—4 of Fig. 3, to illustrate particularly the solenoid for operating the slow feed and quick traverse clutch; Fig. 5 is a detail view looking from the left, of the foot treadle and certain of the actuating connections controlled thereby for starting the table; Fig. 6 is a plan view of the parts shown in Fig. 5, but with the top casing broken away to show underlying parts; Fig. 7 is a detail sectional view looking from the left and taken on the line 7—7 of Fig. 6; Fig. 8 is a detail view in front elevation of the latch for locking the treadle out of operation; Fig. 9 is an enlarged view looking from the rear, of a mercury control switch connected to the foot treadle, together with the actuating mechanism therefor including control dogs mounted on the back side of the table; Fig. 10 is a sectional view taken on the line 10—10 of Fig. 9; Fig. 11 is a diagrammatic view of the electrical connections for controlling the operation of the machine; and Fig. 12 is a simplified diagram of the wiring connections shown in Fig. 11.

The invention is herein disclosed as embodied in a plain milling machine of the type which comprises a horizontal milling machine cutter mounted on a stationary supporting column, a longitudinally movable work table, and a vertically adjustable knee on which the table is mounted to slide. The cutter spindle is driven from an electric motor mounted on the machine column through intermediate gearing including a set of change speed gears which are adjustable to drive the cutter at a plurality of predetermined rates.

In accordance with a principal feature of the invention, a separate electric motor is provided for driving the reciprocable work table which is mounted on the vertically adjustable knee, together with all of the intermediate gearing including slow feed and quick traverse transmission trains, pick-off gears for selecting the feeding rate at which the table is to be driven, and a slow feed and quick traverse clutch for selectively connecting said transmission trains to drive the table alternatively at a feed or quick traverse rate. With this construction and arrangement of the parts, it will readily be seen that the table driving devices comprise a wholly independent and self-contained unit which forms an integral part of the work supporting assembly including the table and vertically adjustable knee, and entirely does away with the necessity for the usual expensive and inefficient driving connections between the stationary column or base and the adjustable support for the table.

In carrying out the present invention, there is also provided an electrical system for controlling the operation of the spindle and table motors and intermediate driving connections which comprises certain novel features adapted to permit a more efficient and mobile control of the machine to meet a wide variety of operating conditions. As hereinafter more fully set forth, switch connections are provided for automatically controlling the operation of the spindle motor which may be set alternatively for a continuous operation of the spindle motor, or for the operation of the spindle motor only during the travel of the table at a feeding rate in either direction, or for the operation of the spindle motor during movement of the table at both a feed or quick traverse rate in either direction.

With the present construction, a foot treadle is provided for starting the table, together with electrical connections including a selector switch which may be set either manually or automatically by the movement of the table, so that the operation of the foot treadle will put the table in operation at a quick traverse right or a quick traverse left as desired.

Referring more specifically to the drawings, the milling machine disclosed comprises a base 120, a machine column 122 which provides a support for a rotary cutter spindle 124 and overarm 126, and a reciprocable work table 128 mounted to slide in ways 130 formed on a vertically adjustable knee 132. In accordance with the usual design of these machines, the knee is supported for verticle sliding movements on ways 134 formed on the front side of the machine column, and is supported in its adjusted vertical position by means of a telescoping screw assembly 136 which is carried on a standard 140 secured to the base 120. The supporting and adjusting screw 136 is rotatably mounted at its upper end in a bearing 144 formed within the knee, and carries a bevel gear 146 which is arranged to mesh with a corresponding gear 148 on a horizontally located control shaft 150 which extends outwardly through the knee casing, and is provided at its outer end with a nut 152 to which may be fitted an adjusting tool or handle of any convenient description for the adjustment of the vertical position of the knee by the operator.

As best shown in Fig. 1 of the drawings, the milling cutter spindle 124 is driven from an electric motor 154 through connections which comprise a gear 156 secured to the spindle and arranged to mesh with a gear 58 on an intermediate shaft 160. Two variable speed gears 162 and 164 are splined on the shaft 160 for engagement alternatively with two corresponding gears 166 and 168 on an intermediate shaft 170 which is in turn connected to the armature shaft 172 of the spindle driving motor 154 by the engagement of a gear 174 on the shaft 170 with a gear 176 on the armature shaft 172.

With the present construction, the table is driven from an electric motor and through intermediate driving connections, all of which are mounted in the knee to provide an independent and wholly self-contained driving unit. As best shown in Figs. 2 and 3, a reversible one speed table motor is provided at 180 mounted on the right side of the knee beneath the reciprocable table, with the armature shaft 182 thereof extending laterally across the knee. The actuating connections for driving the table from the motor 180 comprise a rack and pinion drive including a rack 186 extending lengthwise of the table and a pinion 188 engaging therewith which is mounted on the upper end of a vertical shaft 190. Secured to the lower end of the shaft 190 is a bevel gear 192 which is arranged to mesh with a corresponding bevel gear 194 secured to a drive shaft 196 which is centrally located in the knee and extends forwardly and rearwardly in a horizontal plane. The drive shaft 196 may be connected alternatively through feeding or quick traverse trains from the motor 180 to drive the table alternatively at slow feed or quick traverse rates, or may be alternatively actuated by means of a hand crank 198 which is loosely sleeved on the outer end of the drive shaft 196, and is provided with clutch teeth 199 arranged for engagement with corresponding teeth formed on the shaft. The connections for driving the shaft 196 alternatively at a slow feed or quick traverse rate from the motor 180, comprise a slow feed and quick traverse member 200 which is splined to the shaft 196, and is provided at one end with clutch teeth 202 arranged for engagement with corresponding teeth formed on a feed driving worm gear 204 which is loosely sleeved to turn on the shaft 196, and is externally supported in a bearing 206 on the knee. At its other end the clutch member 200 is provided with clutch teeth 208 arranged for engagement with corresponding teeth formed on a quick traverse driving member in the form of a bevel gear 210 which is loosely sleeved to turn on the shaft 196, and is externally supported in a bearing 212 on the knee. The clutch member 200 is splined to rotate with the shaft 196, and is moved axially with relation thereto by connections which include a cross link 216 which extends through a slot 218 formed in the shaft 196, and is connected intermediate its length to a lengthwise movable control rod 220 which is supported within an axial bore extending the length of the drive shaft 196. The position of the control rod 220 is controlled by means of a solenoid 222 through connections which include a bell-crank lever or frame 224 on a pivot shaft 226 having a horizontally extending arm connected to the armature shaft 228 of the solenoid 222, and having two upwardly extending arms provided with rolls 230 adapted for engagement in a cam groove 232 in a sleeve control member 234 on the shaft 196. The sleeve control member is in turn connected to the control rod 220 by means of a cross pin 236 which extends through a slot 238 in the drive shaft 196, being connected intermediate its length to the control shaft 220, and at each end to the control sleeve 234. During the operation of the machine, the feeding and quick traverse clutch 200 is normally located with the clutch teeth 202 engaging with the corresponding teeth in a driving worm gear 204 by means of two compression springs 250 which are coiled respectively about pins 252 which are mounted on a cross shaft 254 on the lower end of the solenoid armature 228, and at their upper ends are guided in apertures 256 formed in the supporting bracket 258 for the solenoid. The springs 250 are inserted between the bearing surfaces on the bracket 258 and the cross shaft 254, and act normally to maintain the armature in a fully depressed position, so that the sleeve 200 will be moved to the left from the hypothetical neutral position shown in Fig. 2, into engagement with the driving worm gear 204. The movement of the solenoid armature 228 downwardly under the pressure of its spring 250 is limited by the engagement of a stop screw 260 in the horizontal arm of the bell-crank 224 with the supporting bracket 258. When it is desired to shift from slow feed to quick traverse operation, the solenoid 222 is energized, causing the armature 228 to be raised, and moving the control rod 220 and clutch 200 controlled thereby to the right, as viewed in Fig. 2. In order to prevent possible injury to the operator through the rotation of the handle with the shaft 196 at the relatively rapid quick traverse rate, the end of the control rod 220 is arranged during the movement to quick traverse position to contact with the closed end of the sleeve hub of the handle 198 and move the handle positively out of clutching engagement with the drive shaft 196.

The driving connections through which power is transmitted to the quick traverse bevel gear member 210, comprises a drive shaft 270 which is mounted parallel to the armature shaft 182 of the table driving motor 180, and has mounted thereon a gear 272 which is arranged to mesh with a gear 274 on the end of the armature shaft 182. There is also mounted on the shaft 270 a bevel gear 276 which meshes with the quick traverse bevel gear member 210, so that this member is continuously rotated during the operation of the table motor in either direction.

The feed worm gear 204 is continuously driven from the armature shaft 182 of the motor and the shaft 270 driven thereby, through connections which include a gear 278 mounted on the shaft 270, to mesh with a gear 280 on a stub shaft 282 which is in turn connected to a series of pick-off or change speed gears to a shaft 284 which has supported thereon a worm 286 arranged for engagement with the driving worm gear 204. The change speed gears referred to, include a gear 288 mounted on the end of the shaft 282 arranged to engage with one of two pick-off gears 290 and 292 on a stub shaft 294, the other of said gears being arranged for engagement with a gear 296 on the worm shaft 284. With this arrangement of parts, it will be readily seen that the feed worm gear 204 is continuously driven during the operation of the table motor 180 in either direction, the direction of rotation of the gear depending upon the direction of drive of the motor.

To enable the operator to feed the table manually by means of the hand crank 198, mechanism is provided for moving the slow feed and quick traverse clutch 200 to neutral position as shown in Figs. 2 and 3, so that the drive shaft 196 is disconnected from its power driving connections. This mechanism comprises a control shaft 239 mounted in the knee and provided at its outer end with a manual control lever 240. A pinion 241 on the shaft 239 engages with a segment formed on a control lever 242 loosely sleeved on the shaft 226 adjacent the bell-crank clutch control lever 224. A pin 243 formed on one arm of the bell-crank 224 engages in a corresponding slot 244 formed in the sleeved hub of the control lever 242, so that movement of the manual lever 240 and control shaft 239 in a counterclockwise direction to the position shown in Fig. 1, will cause the shoulder forming one end of the slot 244 to engage with the pin 243 to move the bell-crank lever 224 and clutch member 200 connected thereto to neutral position against the pressure of the springs 250.

The movement of the manual lever 240 to move the clutch 200 to neutral position, acts through connections having substantially the mode of operation of the inventors' pending application Serial No. 743,652, filed September 12, 1935, to unlock the feed case door 245 to permit access by the operator to the change speed gears, and simultaneously to disconnect the motor to prevent starting. As best shown in Figs. 1 and 3, these connections include a rock shaft 246 mounted in the knee and provided at its forward end with a latch 247 arranged to engage with a ledge 248 on the inside of the door. An upwardly extending lever arm 249 secured to the inner end of the shaft 246, is connected by means of a link 251 to an upwardly extending lever arm 253 on the control shaft 239. The motor switch is simultaneously locked in stop position through connections comprising a lateral extension 255 on the control lever 242 which engages in a notch formed in a vertically movable link 257 connected at its upper end to a switch locking lever 259, having substantially the same construction and operation as that shown in applicants' prior application above referred to.

The machine herein disclosed is controlled through electrical connections which are arranged to control the operation of the reversible driving motor for the table, the slow speed and quick traverse clutch above described, and also the spindle motor, to secure a simple and efficient control of these elements for the power operation of the machine by the operator, or automatically by means of dogs mounted on the work supporting table. These connections are substantially similar to those described in the copending application of the present inventors, Serial No. 743,652, filed September 12, 1934, for Milling machines, and include main switches for each of the spindle and table driving motors and for the quick traverse clutch solenoid 222, together with a series of secondary switches which are controlled from a control post 298 mounted on the front side of the knee 132 for automatic operation through a series of automatic control buttons arranged for engagement with cooperating dogs on the work supporting table, and for manual operation by means of a similar series of manually operable buttons mounted on the front side of the control post 298. Inasmuch as the disposition of these control buttons and dogs on the machine are fully set forth in the applicants' application above referred to, and form no part of the present invention, specific illustration thereof has been omitted except as they appear on the electrical diagrams Figs. 11 and 12.

The construction and operation of the electrical connections for controlling the operation of the table and cutter spindle respectively through their driving motors and the slow feed and quick traverse clutch 200, will be briefly described in connection with the electrical wiring diagram Fig. 11 and the explanatory diagram Fig.

12, so far as necessary to make clear the connection therewith of the several new and improved features of construction and operation of the machine above set forth.

The table driving motor and spindle driving motor are driven from a three phase power line designated as $L^1$, $L^2$ and $L^3$. The table motor is controlled by means of a reversing switch having two elements L and R.

The main switch for the table motor is supported on a panel indicated in dotted lines at 300 in Fig. 11, and comprises two sets of contacts which are controlled by the relay coils R and L respectively, to connect the motor and table for right or left hand operation. Also mounted on the panel 300 is a switch for controlling the operation of the slow feed and quick traverse clutch solenoid 222 which comprises a series of contacts controlled by a relay coil RC.

On another panel indicated at 302 in dotted lines, are carried the main switch contacts for the spindle motor 154 controlled by means of two relay coils SF and SR for opposite directions of rotation of the motor and spindle driven thereby.

There are also provided on a panel 304 designated in dotted lines in Fig. 11, two secondary relay switches which are arranged to control the operation of the table, spindle, and slow feed and quick traverse solenoid switches above described. These secondary relays comprise secondary coils LR and RR controlled respectively by Feed left and Feed right buttons as marked in the electrical diagrams Figs. 11 and 12, and the coils TL and TR controlled respectively by the Fast left and Fast right buttons for quick traverse operation of the table. Panels 300 and 304 are mounted on the knee.

Inasmuch as the several operating cycles of the electrical connections illustrated in Figs. 11 and 12, have been fully described in applicants' copending application above referred to, specific description of the same is omitted except so far as may be necessary to illustrate the connection of certain features of the present invention therewith.

In accordance with one feature of the present invention, a foot treadle 310 is provided in addition to the manual and table actuated control buttons above mentioned which may be actuated by the operator to start the table at a quick traverse rate in either direction. The treadle 310 as best shown in Figs. 1, and 5 to 7, inclusive, takes the form of a plate which has formed thereon two upwardly extending ears 312 journalled to receive a pivot shaft 314 supported in a bracket 316 on the front side of the machine base 120. A lug 318 formed on the rear side of the treadle plate 310, is arranged for engagement with a switch button 322 which is supported within a casing 324, and acts when pressed inwardly by a downward movement of the treadle 310, to close switch contacts 27—29 as best shown in the electrical diagram Figs 11 and 12, to start the table at a quick traverse rate in a direction determined by a selector switch hereinafter more fully to be described. The foot treadle is constructed and arranged so that it may be swung upwardly to an inoperative position as shown in dot and dash lines in Fig. 5. In order to prevent accidental operation of the foot treadle, a latch 326 is provided pivotally carried on a stud 328, and is arranged to move downwardly in front of the electrical push button 322, so that an accidental movement of the treadle 310 downwardly into operative position, will cause the lug 318 to be engaged by and blocked against further movement toward the button by the intervening latch lever 326. When it is desired to position the foot treadle 310 for operation, the latch lever 326 is lifted so that the lug 318 is permitted to move under the latch lever into contact with the electric push button 322, as best shown in Fig. 7. With this construction and arrangement of the parts, it will readily be seen that if the foot treadle 310 is moved upwardly to its inoperative position, the latch lever which is normally supported on the lug 318, is permitted to fall into position in front of the push button 322 to lock the foot treadle out of operation.

In accordance with another feature of the present invention, electrical connections including a selector switch are provided which may be controlled by the operation of the foot treadle 310, to start the table at a quick traverse rate alternatively in either direction. The selector switch may be positioned manually by the operator, so that the pressing of the foot treadle will put the table in operation at a quick traverse left or alternatively at a quick traverse right, or may be located in a neutral position to entirely disconnect the electrical starting connections operated by the foot treadle when so desired, to provide an additional safeguard against accidental starting of the machine by the foot treadle.

Further, in accordance with the present invention, mechanism is provided which may be controlled by means of table dogs automatically to shift the position of the selector switch during the travel of the table in either direction, so that the operation of the foot treadle will then operate automatically to start the table at a quick traverse rate in the opposite direction.

As best shown in Figs. 9 to 12 inclusive, the selector switch takes the form of a mercury switch 330 mounted in a clip 332 on a U-shaped bracket 334 which has formed on one arm thereof a tubular extension 336 rotatably mounted in a bearing 338 in the knee 332. The electrical connections for the switch comprise a lead 27 to a contact centrally located within the tube, and a quick traverse left lead indicated at 10 and a quick traverse right lead indicated at 15 which are connected respectively to contacts located at opposite ends of the tube, so that the tilting of the switch from the horizontal in either direction will cause the connection to be closed alternatively for quick traverse operation of the table to the left or to the right. The angular position of the bracket 334 and the mercury switch 330 supported thereon, may be controlled manually by means of a hand lever 340 which is supported upon a rock shaft 342 journalled in the knee 132 in axial alignment with the cylindrical support 336 for the bracket. The hand lever 340 and shaft 342 are operatively connected to the bracket 334 by means of a spring-pressed plunger 344 which is mounted within an axial bore 346 in the shaft 342, and is provided with a wedge-shaped tip 348 arranged for engagement with a slot 350 formed in the adjacent side portion of the bracket 334.

The operation of the selector switch 330 may be controlled automatically by the movement of the table, so that the operation of the foot treadle will cause the table to be started at a quick traverse rate to the left or right depending upon whether the table has been stopped at one or the other end of its travel, by means of mechanism which comprises two vertically movable plungers 354 and 356 which are provided with rack teeth arranged for engagement with corresponding teeth formed on opposite sides of a sleeve 358 keyed to the cylindrical bearing 336 of the bracket 334. The plungers 354 and 356 are provided at their upper ends with V-shaped tips which are arranged for engagement with V-shaped dogs 360 and 362 adjustably supported in the usual T-shaped slot 364 formed on the back side of the table. The engaging portions of the plungers and the corresponding engaging portions of the dogs are offset so that the dog 360 engages only with the plunger 354 during the table travel in either direction, and the dog 362 engages only with the plunger 356. In order to maintain the selector switch 330 in the selected neutral or operating position, a V-shaped plunger 366 is supported in a recess directly above the sleeve pinion 358 in the knee, and is spring-pressed into engagement with a corresponding detent surface 368 having the shape of an inverted W formed on the upper side of the sleeve pinion 358 by means of a compression spring 370 seated at one end within a central bore in the plunger, and at its other end against a hollow nut 374 screw-threaded within the upper end of the recess.

The operation of the foot treadle to start the machine at a quick traverse left or quick traverse right may be described briefly in connection with the electrical diagrams Figs. 11 and 12 as follows:—

With the machine in stop position, the R contacts 2—8 and the L contacts 8—29 are closed. If it is desired now to start the machine at a quick traverse left by means of the foot treadle 310, the selector switch is positioned to close the circuit through the contacts 10—27. The operation of the foot treadle now closes the contacts 27—29, energizing TL coil. TL contacts 10—7 close and energize coil LR. TL contacts 20—21 and 21—22 close and energize coil RC through plugging switch contacts 22—2. The closing of the RC switch energizes the slow feed and quick traverse clutch solenoid 222 through contacts L³—62 and L¹—61, shifting the clutch to quick traverse position. LR contacts 2—31 close but simultaneously RC contacts 31—35 open, so that the spindle is prevented from starting unless the spindle selector switch is in a position marked "Intermittent" for continuous operation of the spindle during the movement of the table in either direction at either a feeding or quick traverse rate as hereinafter more fully to be described.

Once the table motor has been started to drive the table in either direction and during the continued operation of the table, the selector switch is wholly disconnected through the operation of the L and R contacts 29—8 and 8—2, since the energizing of the L coil operates automatically to open the switch contacts 29—8, and similarly the energizing of the R coil to drive the table to the right, operates automatically to open the R contact 8—2. This construction and arrangement of the parts is particularly advantageous, inasmuch as an accidental operation of the foot treadle during the movement of the table at a feeding rate in either direction cannot operate to change the operation from feed to quick traverse, with resultant damage to the machine. Essentially, this arrangement makes the treadle effective only for starting the machine.

In accordance with another feature of the present invention, novel and improved switch connections are provided for controlling the starting and stopping of the spindle motor, so that the spindle motor may be alternatively operated continuously irrespective of the operation of the table, or may be driven continuously only during the operation of the table whether at a feeding or quick traverse rate, or may alternatively be driven intermittently only during the movement of the table at a feeding rate. To this end an improved selector switch is provided for controlling the operation of the spindle motor, as generally indicated at 280 in Figs. 11 and 12, which may be operative connected at three separate stations which are designated at Intermittent, Continuous and Intermittent feed. It will readily be seen from an inspection of the electrical diagrams, that selector switch 380 when located at the station marked Intermittent, is connected through the LR or RR contacts 2—31, so that a circuit is completed to energize either the SF or SR coils for operation during the continued travel of the table in either direction, whether at a feeding or quick traverse rate. With the switch 280 positioned at the station marked Intermittent feed, the circuit is completed through either the SF or SR coil to drive the spindle motor only during the operation of the table at a feed rate, since the energizing of the RC coil for the quick traverse operation of the table, causes the RC contacts 31—35 to open, thus disconnecting the spindle motor. With the switch 380 positioned at the station marked Continuous, the circuit to the SF or SR coil for driving the spindle motor, is closed through the SF or SR interlock 2—38, so that the spindle motor is maintained in continuous operation until stopped by the operator, as, for instance, by the movement of the spindle clockwise and counterclockwise switches marked CW and CCW on the diagrams to neutral position. With the selector switch 380 in continuous position, the spindle motor may be started by pressing the spindle motor jog switch, thus closing a circuit through the contacts 2—35 to energize either the SF or SR coil, which in turn causes the corresponding SF or SR interlock 2—38 to close.

The invention having been described, what is claimed is:—

1. In a milling machine, the combination with a machine column and a rotary cutter spindle supported on the column, of a work supporting assembly comprising a movable work support, a secondary support on which the work support is carried adjustable with relation to the column and cutter spindle, an electric motor and driving connections carried on one of said supports for driving the work support alternatively at feeding and quick traverse rates comprising feeding and quick traverse trains on said support connected for continuous operation from the motor, a driving member on said support connected to drive the work support, a feed-traverse clutch shiftable to connect said feed and traverse trains alternatively to said driving member, electrically operated means including a solenoid for shifting the clutch, a reversing switch for the motor, and control switch devices to start and stop and to determine the rate and direction of travel of the work support.

2. In a milling machine, the combination with a machine column and a rotary cutter spindle supported on the column, of a work supporting assembly comprising a reciprocable table, a work supporting knee having ways on which the table is mounted to slide and in turn supported for vertical sliding adjustment on the machine column, driving connections for the table comprising an electric motor supported on the knee at one side thereof beneath the table, driving connections for driving the table alternatively at slow feed and quick traverse rates comprising a slow feed and quick traverse clutch centrally located on said knee, a driving connection therefrom to the table also centrally located on said knee, a feed driving train including reduction and pick-off gears mounted on the side of the knee opposite said motor, and a quick traverse driving train comprising a branch connection from said driving train to said clutch, said gear connections and motor being located to balance the weight thereof on the knee.

3. In a milling machine, the combination with a machine column and a rotary cutter spindle supported on the column, of a work supporting assembly comprising a reciprocable table and supporting means therefor including a vertically adjustable knee, a reversible electric motor supported on the knee at one side thereof beneath the table and having an axis of rotation parallel to the direction of table travel, a drive shaft centrally located on the knee and extending transversely of the direction of table movement, connections from said shaft for driving the table, a slow feed and quick traverse clutch element splined to said shaft, feed driving connections from said motor including a feed worm gear rotatably mounted on the shaft, a worm engaging therewith and pick-off gears between the worm and the motor located on the side of the knee opposite the motor, and quick traverse connections from said motor including a quick traverse gear rotatably mounted on said shaft, and means for operatively connecting said clutch element alternatively to said feed worm gear and to said quick traverse gear.

4. In a milling machine, the combination with a rotary cutter spindle and a support therefor, of a reciprocable work table, a power drive for the work table comprising an electric motor and connections therefrom for driving the table in opposite directions, electrical connections for controlling the operation of said motor drive for starting and stopping and for determining the direction of table movement, and auxiliary starting connections for the table comprising a foot treadle and a starting circuit controlled thereby including a starting switch actuated by the foot treadle, and a selector switch adjustable for causing the actuation of the foot treadle to start the table movement alternatively in opposite directions.

5. In a milling machine, the combination with a rotary cutter spindle and a support therefor, of a reciprocable work table, a power drive for the work table comprising an electric motor and connections therefrom for driving the table in opposite directions, electrical connections for controlling the operation of said motor drive for starting and stopping and for determining the direction of table movement, and auxiliary starting connections for the table comprising a foot treadle and a starting circuit controlled thereby including a starting switch actuated by the foot treadle, a selector switch adjustable for connecting the circuit with said electrical connections to start the table alternately in opposite directions, a safety switch in said circuit, and means rendered operative in starting the table movement for actuating the safety switch to render the circuit inoperative.

6. In a milling machine, the combination with a rotary cutter spindle and a support therefor, of a reciprocable work table, a power drive for the work table comprising an electric motor and connections therefrom for driving the table in opposite directions, electrical connections for controlling the operation of said motor drive for starting and stopping and for determining the direction of table movement, and auxiliary starting connections for the table comprising a foot treadle and a starting circuit controlled thereby including a starting switch operatively connected to the foot treadle, a selector switch having neutral and alternative driving positions for disconnecting said circuit and for connecting said circuit with said electrical connections to start the table alternatively in opposite directions.

7. In a milling machine, the combination with a rotary cutter spindle and a support therefor, of a reciprocable work table, a power drive for the work table comprising an electric motor and connections therefrom for driving the table in opposite directions, electrical connections for controlling the operation of said motor drive for starting and stopping and for determining the direction of table movement, auxiliary starting connections for the table comprising a foot treadle and a starting circuit controlled thereby including a starting switch operatively connected to the foot treadle, a selector switch adjustable for causing the actuation of the foot treadle to start the table movement alternatively in opposite directions, and a safety latch acting when rendered operative to lock the foot treadle out of operation.

8. In a milling machine, the combination with a rotary cutter spindle and a support therefor, of a reciprocable work table, a power drive for the work table comprising an electric motor and connections therefrom for driving the table in opposite directions, electrical connections for controlling the operation of said motor drive for starting and stopping and for determining the direction of table movement, and auxiliary starting connections for the table comprising an auxiliary starting circuit, a starting switch in said circuit, a foot treadle movable to engage with and close said starting switch, and a safety latch acting when rendered operative to lock the foot treadle out of engagement with said starting switch.

9. In a milling machine, the combination with a rotary cutter spindle and a support therefor, of a reciprocable work table, a power drive for the work table comprising a reversible electric motor, and connections therefrom for driving the table alternatively at feeding and quick traverse rates and in opposite directions, electrically controlled operating switches for operating the motor and table in opposite directions, an electrically controlled quick traverse switch acting when rendered operative to adjust said motor and driving connections for quick traverse operation of the table, control elements for said switches to determine the direction and rate of travel of the table, and auxiliary starting connections for starting the table at quick traverse in either direction comprising a foot treadle, a starting switch operatively connected thereto, electrical connections from said starting switch to each of said operating and quick traverse switches, and a selector switch adjustable for electrically connecting one or the other of said operating switches to the starting switch.

10. In a milling machine, the combination with a rotary cutter spindle and a support therefor, of a reciprocable work table, a power drive for the work table comprising an electric motor and connections therefrom for driving the table in opposite directions, electrical connections for controlling the operation of said motor drive for starting and stopping and for determining the direction of table movement, and auxiliary starting connections for the table comprising a foot treadle and a starting circuit controlled thereby including a starting switch actuated by the foot treadle, a selector switch, and means acting automatically during the table travel in either direction for positioning said selector switch to cause the table to be started in the opposite direction upon actuation of the foot treadle.

11. In a milling machine, the combination with a rotary cutter spindle and a support therefor, of a reciprocable work table, a power drive for the work table comprising an electric motor and connections therefrom for driving the table in opposite directions, electrical connections for controlling the operation of said motor drive for starting and stopping and for determining the direction of table movement, and auxiliary starting connections for the table comprising a foot treadle and a starting circuit controlled thereby including a starting switch actuated by the foot treadle, a selector switch adjustable for causing the actuation of the foot treadle to start the table movement alternatively in opposite directions, and means for automatically adjusting the position of said selector switch during the movement of the table comprising a dog on the table and a switch actuating member arranged to be engaged thereby.

12. In a milling machine, the combination with a rotary cutter spindle and a support therefor, of a reciprocable work table, a power drive for the work table comprising a reversible electric motor, and connections therefrom for driving the table alternatively at feeding and quick traverse rates and in opposite directions, electrically controlled operating switches for operating the motor and table in opposite directions, an electrically controlled quick traverse switch acting when rendered operative to adjust said motor and driving connections for quick traverse operation of the table, control elements for said switches to determine the direction and rate of travel of the table, and auxiliary starting connections for starting the table at quick traverse in either direction comprising a foot treadle, a starting switch operatively connected thereto, electrical connections from said starting switch to each of said operating and quick traverse switches, a selector switch adjustable for electrically connecting one or the other of said operating switches to the starting switch, and switch connections in said circuit rendered operative by the actuation of either of said operating switches to disconnect the starting circuit.

13. In a milling machine, the combination with a rotary cutter spindle and a work support reciprocable with relation thereto, of a spindle driving motor, a power drive for the work support comprising a reversible electric motor, and connections therefrom for driving the work alternatively at feeding and quick traverse rates and in opposite directons, electrical connections for controlling the operation of said motor drive for starting and stopping, and for driving the work support at a selected feeding or quick traverse rate in either direction, and electrical connections for starting and stopping the spindle motor comprising a spindle motor start and stop switch, and connections for controlling the operation of said switch including a relay holding circuit for continuous operation of the spindle motor, a circuit controlled by said connections for driving the work at feeding and traverse rates to drive the spindle during table movement, a circuit controlled by said table feed connections to drive the spindle only during table travel at a feed rate, and a selector switch adjustable to connect alternatively any one of said circuits.

14. In a milling machine, the combination with a rotary cutter spindle and work support reciprocable with relation thereto, of a spindle driving motor, a power drive for the work support comprising a reversible electric motor and connections therefrom for driving the table alternatively at feeding and quick traverse rates and in opposite directions, electrically controlled operating switches for operating the motor and support in opposite directions, an electrically controlled quick traverse switch, connections acting when rendered operative to actuate said motor drive at a quick traverse rate, control elements for said switches to determine the direction and rate of travel of the support, and electrical connections actuated by said control elements for starting and stopping the spindle motor comprising a selector switch having three alternative positions, and separate electrical circuits controlled by the position of said switch alternatively to connect the spindle motor for continuous operation, or through said motor operating switch to drive the spindle intermittently only during the movement of the support in either direction, or alternatively through said operating and quick traverse switches to drive the spindle only during the travel of the support at a feeding rate.

15. In a milling machine, the combination with a machine column and a rotary cutter spindle supported on the column, of a work supporting assembly comprising a reciprocable work support and a secondary support on which the work support is carried adjustable with relation to said column and spindle, driving and control devices for reciprocating said work support mounted integrally with said assembly comprising a reversible motor on one of said supports, driving connections supported integrally with said assembly for driving the table therefrom including a feed and quick traverse clutch, a solenoid for controlling the position of the clutch, and control switch connections on said assembly including a control post on the secondary support for controlling the operation of the motor and solenoid to drive the work support alternatively at feeding and quick traverse rates, and in opposite directions.

16. In a milling machine, the combination with a rotary cutter spindle and a spindle support, of a reciprocable work support, power driving means for the work support including an electric motor, a quick traverse driving train, a slow feed driving train including change speed gears, a drive shaft connected to drive the work support, a slow feed and quick traverse clutch having alternative neutral and driving positions connecting said drive shaft alternatively with said slow feed and quick traverse trains, a manually operable lever for manual operation of said drive shaft and work support, a cover for said change speed gears, connections for locking the cover in closed position, connections for electrically disconnecting the motor, connections for moving the clutch to neutral position, and a manually operable control member for simultaneously actuating each of said connections to unlock the cover, to positively disconnect the motor, and to move the clutch to neutral position.

17. In a machine tool, a driven member, driving connections therefor including a prime mover, a plurality of operating shafts, a set of intermeshing pick-off gears mounted thereon, and a clutch connection through which the member is driven, a casing within which said gears are housed, a casing cover, a control element movable to render said driving connections alternatively operative and inoperative to drive said member including a connection actuated by said element to disconnect the clutch, and connections between said control element and cover arranged to prevent the opening of the cover except when the control element is in a position rendering said driving connections inoperative.

18. In a milling machine, the combination with a rotary cutter spindle and work support reciprocable with relation thereto, of a spindle driving motor, a power drive for the work support comprising a reversible electric motor and connections therefrom for driving the table alternatively at feeding and quick traverse rates and in opposite directions, and an electric control system for the machine including feed switch connections for driving the table in either direction at a feed rate, traverse switch connections operable to drive the table in either direction at a quick traverse rate, a spindle motor switch operable to drive the spindle motor in either direction, and electrical connections for controlling the operation of the spindle motor switch including a relay holding circuit for continuous operation of the spindle motor, a circuit controlled by any one of said table feed and traverse switch connections to drive the spindle during table movement, a circuit controlled by said table feed switch connections to drive the spindle only during table travel at a feed rate, and a selector switch adjustable to connect alternatively any one of said circuits.

19. In a milling machine, the combination with a rotary cutter spindle and a support therefor, of a reciprocable work table, a power drive for the work table comprising an electric motor and connections therefrom for driving the table in opposite directions, electrical conections for controlling the operation of said motor drive for starting and stopping and for determining the direction of table movement, and auxiliary starting connections for the table comprising a manually operable control member and a starting circuit controlled thereby, including a starting switch actuated by the foot treadle, a selector switch, and means acting automatically during the table travel in either direction for positioning said selector switch to cause the table to be started in the opposite direction upon actuation of the manually operable control member.

ARTHUR F. BENNETT.
AUGUST L. KRAUSE.